Sept. 19, 1967 E. ZIELER ET AL 3,342,933
MEDICAL X-RAY TELEVISION SYSTEM OF THE KIND COMPRISING AN ADJUSTABLE CONTRAST CONTROL
Filed June 10, 1963
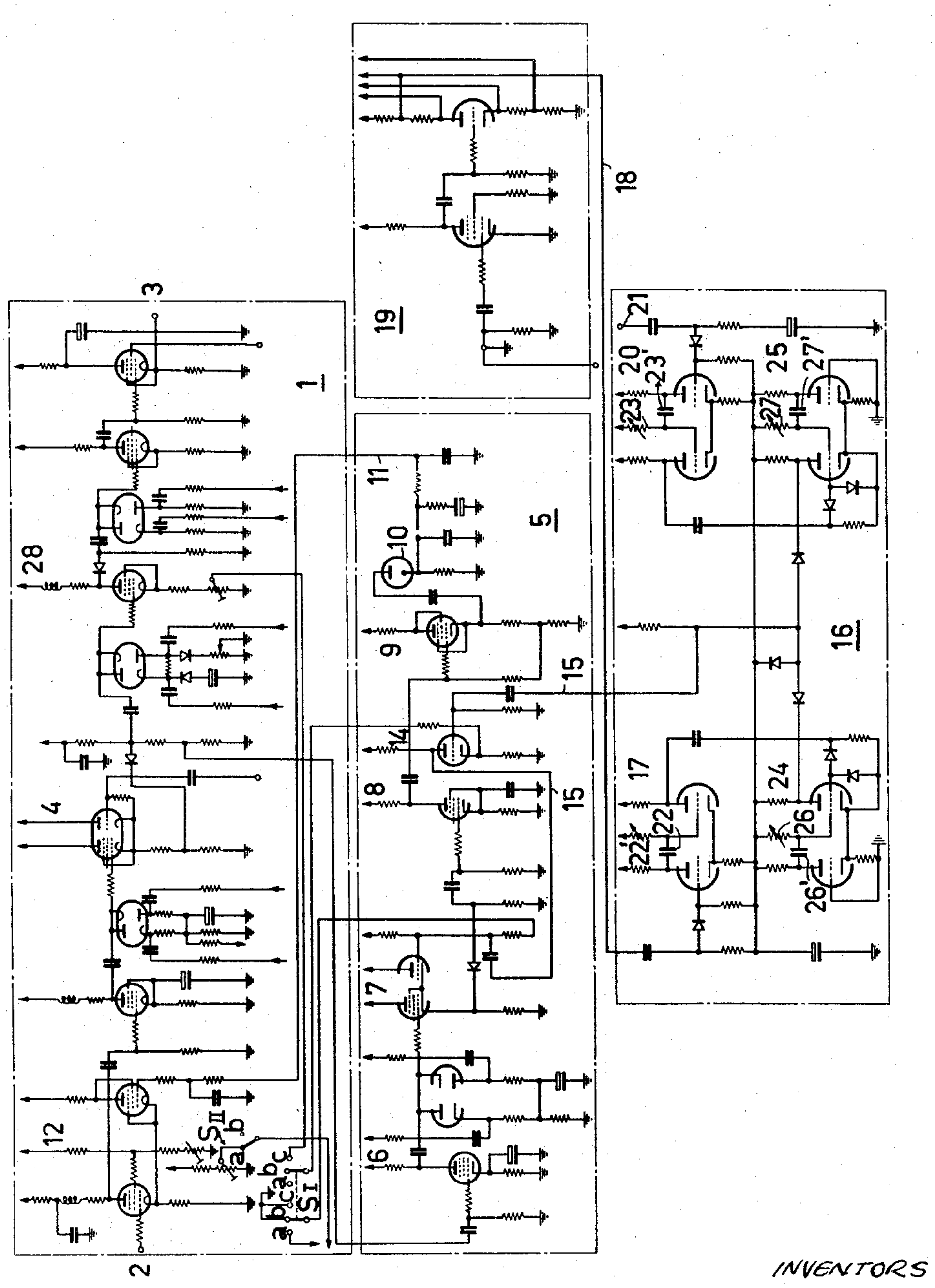
INVENTORS
ERICH ZIELER
HORST ERMER 3,342,933

MEDICAL X-RAY TELEVISION SYSTEM OF THE KIND COMPRISING AN ADJUSTABLE CONTRAST CONTROL

Erich Zieler and Horst Ermer, Hamburg, Germany, assignors to North American Philips Company, Inc., New York, N.Y., a corporation of Delaware Filed June 10, 1963, Ser. No. 286,693
Claims priority, application Germany, July 3, 1962, M 53,415
4 Claims. (Cl. 178—7.1)

It is known to use amplitude-stabilisation arrangements in medical X-ray television systems, in order to obtain substantially equal amplitudes at the output of the video amplifier in the event of strongly varying brightness levels of the input phosphor screen during screening of different objects. Such devices are also used in industrial X-ray technology, where for instance in viewing external scenes the sensitivity of the vidicon is readjusted by the control of the signal anode voltage so that the signal amplitude is not substantially changed.

In medical television circuits use is furthermore made of an amplification control which has, as compared with the control of the anode signal voltage, the advantages that a very rapid control is obtained at low cost and that with a high light intensity of the input member, the said control improves the signal-to-noise ratio, which remains constant with the vidicon control.

All these arrangements have time constants of a range from a few image periods to a great many image periods. The control-signal is obtained on the basis of the average of the overall image information during said time. However, this kind of control has important disadvantages, particularly when used in surgical image intensifiers, since in this case undamped effective radiation frequently strikes the image intensifier at the side of the object to be screened. Since the control-signal is derived from the overall image information the high amplitudes produced by this undamped effective radiation play an important part in the magnitude of the control-signal, although they do not convey useful details of the image. As a result, the brightness in the range behind the screened object is reduced to an extent such that the visibility of the image is substantially reduced.

If the excessive radiation was only transient, the above control-effect could be avoided by limiting excessively high amplitudes at the display tube in order to overcome the effect of the excessive radiation. Moreover, a high time constant could be provided for the control, so that the control does not become effective during the transient excessive radiation. However, especially in surgical use it must be taken into account, when extremities are X-rayed, that excessive radiation appears in the image field for substantially the entire examination period. If the control were switched off for example, the disadvantage arises that the brightness must be manually adjusted with successive screening of body parts of different thicknesses.

The invention obviates these disadvantages in medical X-ray television systems with automatic gain control, in which the control-signal for the video amplifier is derived from the image information, by providing a comparatively rapidly operating control with a control-signal derived from only part of the image information. According to the invention, image information is derived from the image signal in the control-path during an optional number of lines and/or portions of lines, or an optional part of the image signal may be keyed out.

The control may correspond, with respect to the amplitude, to a predetermined delay. The control-signal can be derived only from a given central region of the image field, while the image intensifier will, in general, be adjusted so that the objects of interest are located in the center of the image field. Beyond this predetermined region, from which the control-magnitude is derived, arbitrary amplitudes may occur without affecting the brightness within said region. White clipping may be employed so that screening off due to excessive radiation in given regions is avoided.

The image areas of interest can be readjusted independently of each other and the position and the size of the image field used for obtaining the control-voltage may be adjusted arbitrarily. If desired only the start of the keying of the image signal may be rendered adjustable, and the duration may be determined by predetermined time constants in the arrangements. In this case the region used for obtaining the control-signal may be shifted within the image field without variation of its size. This is, however, not strictly necessary for use in surgical devices, where, as a rule, the adjustment will be at the center.

When the X-ray image intensifier and television system is used for internal medicine, excessive radiation may occur, for example, when screening of the heart since the adjacent thorax region is much more permeable to rays, or when screening the transition between the chest cavity and the abdomen, since the abdomen absorbs much more radiation than the chest cavity, or when screening of the chest cavity while the patient turns around, since the undamped effective radiation passing by the body strikes the image intensifier. In these cases it is not always convenient to use a central position of the image field for obtaining the control-voltage. The central position may fall for instance in the shadow of a part containing contrast substance, for example the stomach, so that the signal has excessively large amplitudes in the more peripheral regions interesting for the diagnostics, with the result that details in said region are suppressed if white clipping is employed. According to the invention this disadvantage is avoided since the position of the image field is manually adjustable during the examination, while the size remains constant due to the predetermined time constant of the arrangement.

The figure of the drawing shows one embodiment of the invention. The video amplifier 1 with the input 2 and the output 3 comprises several tubes with the associated diode terminal connections, which need not be further explained. After the stage of tubes 4 the video signal is derived and fed to an amplifier 5 with the tubes 6 to 9 for producing a control-voltage at the diode 10. The control-voltage passes via the conductor 11 to the stage 12 of the video amplifier.

A signal supplied by a keying stage 16 is fed to the stage of tubes 7 in amplifier 5, via the tube stage 14 and conductors 15 and 15'.

This keying stage 16 comprises the delay stage 17 for the line pulse, which is supplied thereto via the conductor 18 and is derived effectively from a stage 19 required for the formation of the keying pulses, and a delay stage 20 for the frame pulse supplied at 21. The delay of the two pulses can be adjusted by the potentiometers 22 and 23 respectively cooperating with the capacitors 22' and 23' respectively. The duration of the delayed pulses is determined by the value of potentiometers 26 and 27 and the capacitors 26' and 27' in tube stages 24 and 25. Thus the start of the signal keying is adjustable, while the duration may be determined by predetermined time constant in the arrangement. In this manner the region for supplying the control-signal can be shifted without variation of its size within the image field.

By means of the switch S1 in the switching position *a* a stationary central circle can be fixed within the image, while a fixed negative bias voltage is fed to the grid of the right-hand tube of the tube stage 7. The arbitrarily adjustable field blanking becomes operative in the switching position *b*, whereas in the switching position *c* the image field can be restricted via the cathode of the video amplifying stage 28. The signal applied to the stage 28 is obtained from the cathode of the tube stage 14 of the amplifier 5.

The part of the image field from which the control-signal is derived may furthermore be varied, without variation in size, by means of a manually operated shifting member, for instance a control-rod adapted to move along two co-ordinates. By the adjustment to image regions of different mean brightness the brightness of the monitor image can be changed.

What is claimed is:

1. An X-ray television system of the type comprising a video amplifier for amplifying video signals corresponding to the lines of sequential frames of a televised image, said system comprising an automatic gain control circuit connected to said amplifier for producing an automatic gain control voltage responsive to the amplitude of said signals, means for applying said voltage to said amplifier for controlling the gain thereof, and means connected to said gain control circuit for inhibiting the production of said control voltage during a predetermined portion of the image during each frame.

2. An X-ray television system of the type comprising a video amplifier for amplifying video signals corresponding to the lines of sequential frames of a televised image, said system comprising an automatic gain control circuit connected to said amplifier for producing an automatic gain control voltage responsive to the amplitude of said signals, means for applying said voltage to said amplifier for controlling the gain thereof, a source of frame pulses, a source of line pulses, means for delaying and varying the duration of said frame and line pulses to produce keying pulses, and means for applying said keying pulses to said gain control circuit for inhibiting the production of said control voltage during a predetermined portion of the image during each frame.

3. An X-ray television system of the type comprising a video amplifier for amplifying video signals corresponding to the lines of sequential frames of a televised image, said system comprising an automatic gain control circuit connected to said amplifier for producing an automatic gain control voltage responsive to the amplitude of said signals, means for applying said voltage to said amplifier for controlling the gain thereof, a source of frame pulses, a source of line pulses, adjustable delay means for delaying said frame and line pulses, means for controlling the duration of said delayed pulses to produce keying pulses of predetermined duration, and means for applying said keying pulses to said gain control circuit, whereby said gain control circuit only produces said voltage when said keying pulses are applied thereto.

4. The system of claim 3 comprising means for applying said keying pulses to said amplifier for cutting off said amplifier except when said keying pulses are applied thereto.

References Cited

UNITED STATES PATENTS

| | | | |
|---|---|---|---|
| 2,809,298 | 10/1957 | Cawein | 178—6.1 |
| 3,214,514 | 10/1965 | Schmid | 178—6 |
| 3,257,506 | 6/1966 | Siepmann | 178—7.2 |

FOREIGN PATENTS

| | | |
|---|---|---|
| 910,116 | 11/1962 | Great Britain. |

JOHN W. CALDWELL, *Acting Primary Examiner.*

DAVID G. REDINBAUGH, *Examiner.*

J. McHUGH, R. L. RICHARDSON,
*Assistant Examiners.*